Aug. 9, 1966 C. S. SLOAN 3,264,727
METHOD OF PRODUCING AN ELECTRONIC UNIT
Filed July 1, 1963
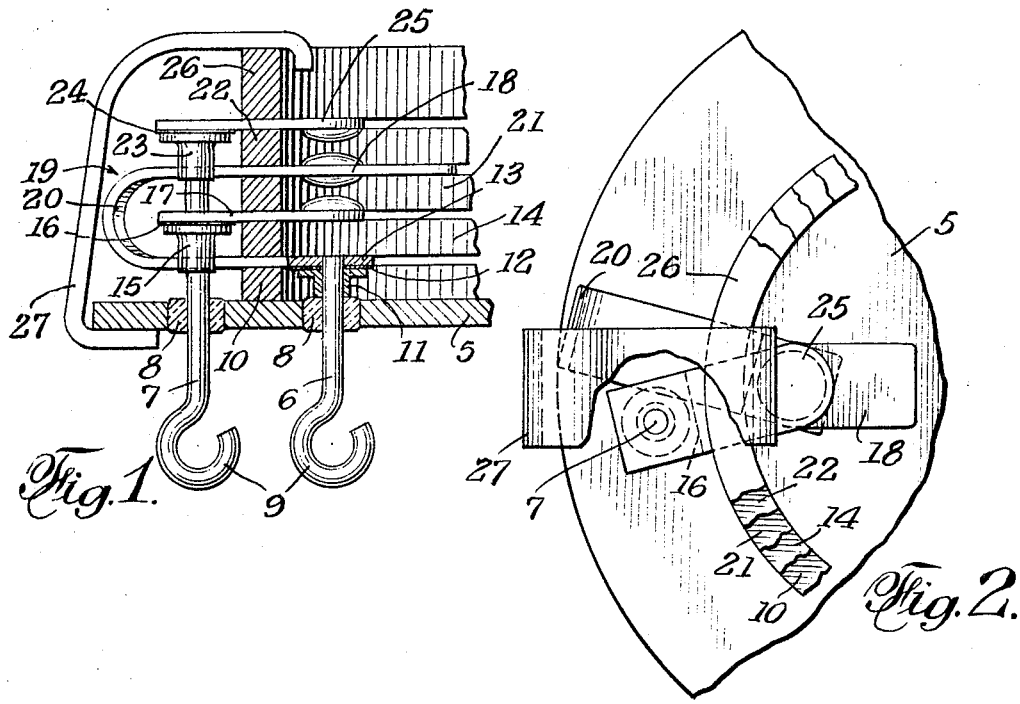
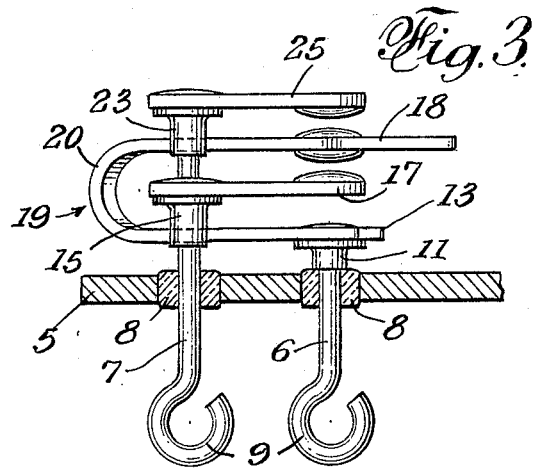
INVENTOR.
CHARLES S. SLOAN
BY C. I. Stratton
ATTORNEY

United States Patent Office 3,264,727
Patented August 9, 1966

3,264,727
METHOD OF PRODUCING AN ELECTRONIC UNIT
Charles S. Sloan, North Hollywood, Calif., assignor, by mesne assignments, to Charles S. Sloan, Sun Valley, Calif.
Filed July 1, 1963, Ser. No. 291,804
8 Claims. (Cl. 29—471.1)

This invention relates to a method for producing an electronic unit, particularly a switch or the like.

The invention is particularly characterized by the ease and facility, afforded by the present method, of assembling and then soldering together a plurality of extremely small elements or components, an object of the invention being to provide a method in which mechanical assembly of small elements is simplified and in which assurance is had that proper assembly is retained during soldering together of said elements.

Another object of the invention is to provide an electronic unit assembling method in which assembly-facilitating spacers are chemically removed after the soldering step has been completed.

This invention also has for its object to provide a novel, economical and convenient method or process of superior utility.

The invention also comprises novel combinations of method steps, which will appear more fully in the course of the following description of the present method or process, the same being based on the accompanying drawing. However, the following specification merely discloses one embodiment of the present invention, and the same is given by way of example only.

In the drawing, like reference characters designate similar parts in the several views.

FIG. 1 is a greatly enlarged and fragmentary sectional view showing an assembly of elements of an electronic unit prepared for baking to melt the solder that electrically joins said components.

FIG. 2 is a plan view thereof.

FIG. 3 is a sectional view, similar to FIG. 1, showing the completed product as produced by the present method.

The present method comprises, generally, the successive steps of assembling a group of electronic elements together with small sheets of solder and with intervening spacer members, applying means to clamp the assembled unit to retain said elements in desired relative position, subjecting the unit, in inverted position, to heat to melt the solder so the same may flow gravitationally among the elements to electrically connect the same, then placing the unit in a caustic bath to chemically erode the spacer members to completely remove them, and, finally, cleansing the unit of the by-products of the eroding step.

The product of the present method is based on an apertured metallic header or plate 5 that may be made of steel, bronze, or any other desired metal that is resistant to the caustic solution that is used for eroding the spacer elements above mentioned. In this instance, said header 5 carries conductor wires 6 and 7 that are fixed in insulating sleeves 8—usually glass—fixedly held in the apertures of the header. It will be understood that as many pairs of wires 6 and 7 may be carried by the header 5 as the number of electronic units desired to be provided on said header. Also, said header may have various shapes and the units may be arranged thereon in circular or other arrangement. Said wires 6 and 7 are provided with hooks 9 on one side of the header 5. The above is generally conventional.

According to the invention, an aluminum ring 10 is placed on the surface of the header 5 opposite to the wire hooks 9, said ring being of a size and shape to engage the header between each pair of insulating sleeves 8 of each unit being assembled on the header. Said aluminum ring is shown as having a square cross-section, but the same may be round.

In this instance, a flanged sleeve 11 is placed loosely over each wire 6, a thin sheet of solder 12 on top of the sleeve 11, and one leg 13 of a contactor on top of the solder 12. The solder and the leg 13 may be apertured, as shown, so the end of wire 6 may extend thereinto. The spacer ring 10 locates said leg 13 of each unit on the header in desired spaced relation to the header 5.

A second aluminum spacer ring 14 is placed on each leg 13 of the several units, and a second sleeve 15 and sheet of solder 16, and a contactor 17 are applied to the wire 7 in the same way the sleeve 11, solder 12 and leg 13 are applied to the wire 6. The contactor 17 is located on a plane spaced from the plane of the leg 13. As shown, said contactor 17 is disposed between the leg 13 and a second and parallel leg 18 of the contactor 19. Said legs 13 and 18 are connected by a resilient bight 20 so that the free end of the leg 18 may be flexed toward and from the contactor 17.

A third aluminum spacer ring 21 is interposed between the contactor 17 and contactor leg 18 of the several units. A fourth aluminum spacer ring 22 is placed on each leg 18 of said units, and a third sleeve 23 and sheet of solder 24, and a contactor 25 are applied to an extension of the wire 7 as described hereinbefore.

Finally, a fifth aluminum ring 26 is placed on the contactor 25 of the several units, and one or more clamp members 27 are applied to clamp the stack of elements, as above described, to the header 5.

It will be noted that the several sleeves, sheets of solder and contacts or contact legs comprise sub-assemblies that are located on the wire 6 or the wire 7, as the case may be, by the first four rings 10, 14, 21 and 22.

The above-described assemblage of the components of an electronic unit and spacer rings is given as exemplary of a variety of arrangements in which more or fewer subassemblies are alternated with spacer rings.

The assembly, as in FIGS. 1 and 2, is then placed in an oven preferably using infrared. By suspending the assembly from the hooks 9, the solder sheets, as the same melt, flow into the sleeves and solder-secure the subassemblies in place.

The clamp members 27 are then removed, the ring 26 falling away because the same is free.

The assembly is then placed in a bath of caustic soda (sodium hydroxide). In a solution of one-half ounce of sodium hydroxide per gallon of water, an overnight immersion (eight to twelve hours) is required for the solution to erode away the aluminum rings 10, 12, 21 and 22. Four ounces of sodium hydroxide to a gallon of water comprises a solution that will erode said rings in seven to eight minutes. A more saturated solution than four to six ounces of the caustic soda is not desired because undesired by-products of large granular consistency are usually produced. From the practical point of view, four ounces of the caustic in a gallon of water is optimum because such a solution effects a fairly rapid erosion of the rings and leaves by-products that are fine and powdery and may be readily washed or flushed off the elements of the unit.

When it is realized that the unit shown in FIG. 3 is approximately five times full size and that the elements thereof are small and difficult to handle while assembling, it will be clear that the present method greatly facilitates accurate assembly of such small electronic units. Also, the method enables great flexibility of assembly with minimum need for expertness, since the spacer rings automatically locate the elements relatively.

While the foregoing discloses what is now contemplated to be the best mode of carrying out the invention, the same is, of course, subsect to modification without departing from the spirit and scope of the invention. Therefore, it is not desired to restrict the invention to the particular method steps or combination or sequence of method steps described, but to cover all equivalent steps or methods that may fall within the scope of the appended claims.

Having thus described the invention, what is claimed and desired to be secured by Letters Patent is:

1. A method of producing an electronic unit that consists in
    (a) placing a plurality of sub-assembled metal elements, one of which is a sheet of solder, in successive planes above a base member,
    (b) alternating aluminum spacers between the sub-assembled metal elements, between the base member and the next adjacent sub-assembly, and above the outmost sub-assembly,
    (c) clamping together the stack formed by the sub-assemblies, spacers and base member,
    (d) applying heat to said stack to melt the sheets of solder to cause the same to flow around adjacent portions of the other metal elements, and
    (e) bathing the stack in a solution of sodium hydroxide until the spacers become sufficiently eroded by the solution to disintegrate into a fine powder, said metal elements being resistant to erosion by said solution.

2. A method according to claim 1 in which the stack, during heat application, is inverted from its position during assembly of the sub-assemblies and spacers.

3. A method for producing an electronic unit that is composed of a plurality of contractors at different plane levels with relation to a base and in operative engagement with at least two conductor wires carried by the base and insulated therefrom, said method consisting in
    (a) assembling a sheet of solder with each contactor,
    (b) placing aluminum spacers between the several contactors, above the outer contactor, and between the lowermost contactor and base,
    (c) clamping together the stack thus formed,
    (d) applying oven heat to said stack to melt the sheets of solder to cause the same to flow around the wires and join the same to the respective contactors, and
    (e) bathing the stack in a solution of sodium hydroxide until the spacers become sufficiently eroded by the solution to disintegrate into a fine powder, said contactors, wires and solder being resistant to erosion by said solution.

4. A method according to claim 3 in which the stack is placed in the oven in inverted position.

5. A method according to claim 3 in which the caustic solution comprises approximately four ounces of sodium hydroxide in one gallon of water.

6. A method according to claim 3 in which the caustic solution comprises approximately four ounces of sodium hydroxide in one gallon of water, and the stack remains in said solution for between seven and eight minutes.

7. A method according to claim 3 in which between one-half to six ounces of sodium hydroxide in one gallon of water comprises the mentioned solution.

8. A method according to claim 7 in which the erosion step is followed by a step to wash off the caustic solution and the resulting powder deposit.

References Cited by the Examiner
UNITED STATES PATENTS

| | | | |
|---|---|---|---|
| 2,632,231 | 3/1953 | Brown | 29—490 X |
| 2,660,682 | 11/1953 | Clokey et al. | 29—491 X |

JOHN F. CAMPBELL, *Primary Examiner.*